UNITED STATES PATENT OFFICE.

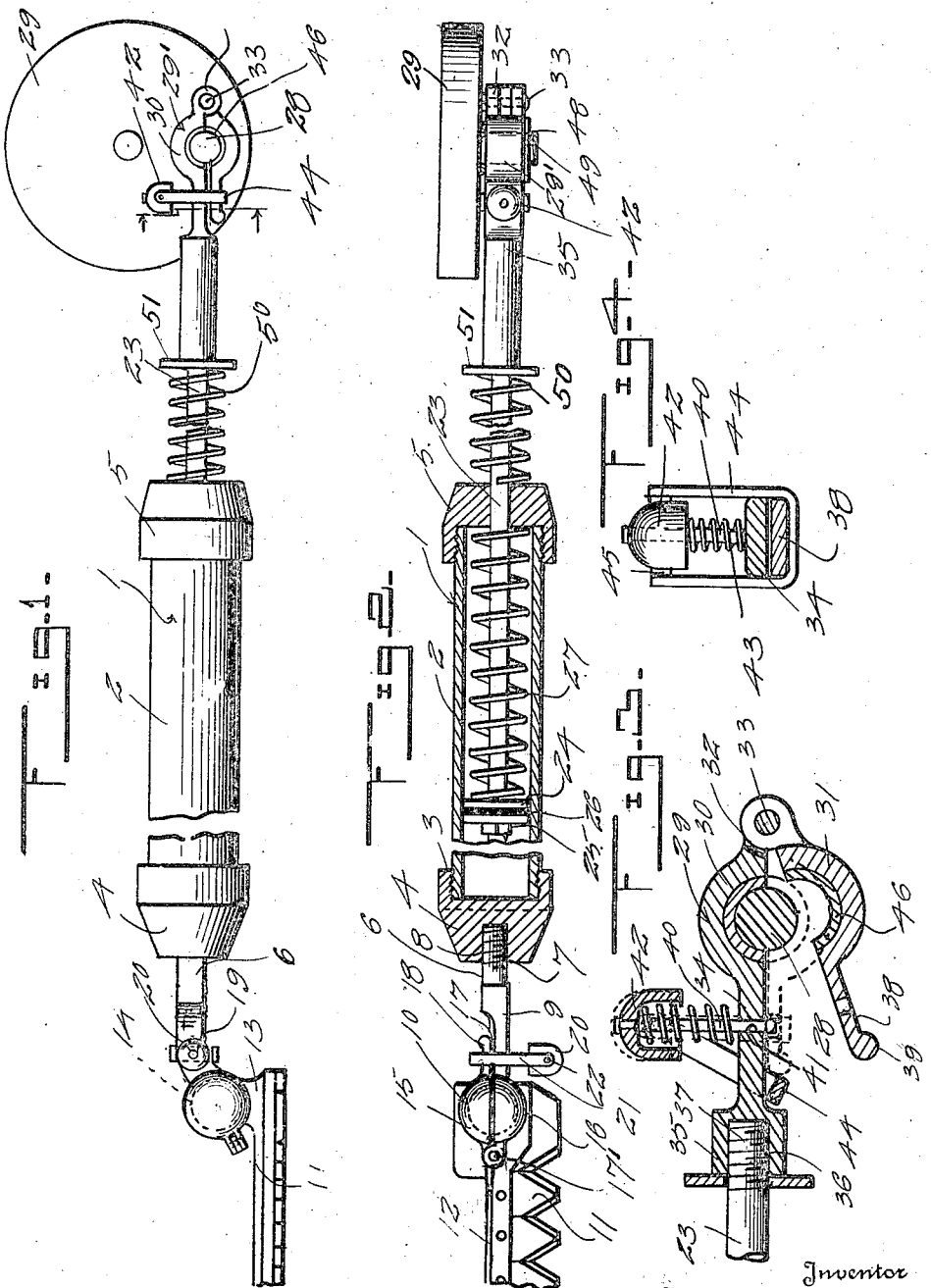

JOHN P. GARDNER, OF SAN FRANCISCO, CALIFORNIA.

PITMAN.

1,262,479.  Specification of Letters Patent.  Patented Apr. 9, 1918.

Application filed November 30, 1917. Serial No. 204,701.

*To all whom it may concern:*

Be it known that I, JOHN P. GARDNER, a citizen of the United States, residing at San Francisco, in the county of San Francisco and State of California, have invented certain new and useful Improvements in Pitmen; and I do hereby declare the following to be a full, clear, and exact description of the invention, such as will enable others skilled in the art to which it appertains to make and use the same.

This invention relates to an improvement in yieldable pitman rods and connections therefor and more particularly to an improvement on the pitman shown in Patent Number 1,166,452 issued to me January 4th, 1916, and the primary object of the invention is to provide a simple type of connection for the yieldable pitman rod for connecting the same to the pitman wheel and reciprocating cutting member.

Another object of the invention is the provision of sectional bearings or straps formed in two parts and pivoted together and held in operative position by spring means for engaging the crank pin of a pitman wheel and the ball on the cutting member, so that the yieldable pitman rod can be readily removed from the machine, when so desired and the bearings replaced when worn out.

A further object of the invention is to generally improve and simplify the yieldable type of pitman rod and connection therefor and to provide a durable and efficient device, which will be easy to manufacture and that can be placed upon the market at a reasonable price.

With these and other objects in view the invention consists in the novel construction, arrangement and formation of parts as will be hereinafter more specifically described, claimed and illustrated in the accompanying drawings, forming a part thereof, in which:

Figure 1 is a side elevation showing an improved yieldable pitman rod and the connections therefor.

Fig. 2 is a plan view partly in section showing the yieldable pitman rod and improved connections or bearings for the same.

Fig. 3 is a fragmentary sectional view showing the means for connecting the pitman rod with the pitman wheel.

Fig. 4 is a detail transverse section taken on the line 4—4 of Fig. 1.

Referring to the drawings in detail, wherein similar reference numerals designate corresponding parts throughout the several views, 1 designates the improved pitman rod, which includes a cylindrical casing 2 which is threaded at both ends at 3, caps 4 and 5 respectively are fitted on the opposite ends of the casing and the cap 4 receives one end of a rod 6. Each end of the rod 6 is threaded as at 7 and an internally threaded aperture 8 is provided within the cap 4 and receives the rod. The opposite end of the rod is threaded into an aperture formed in the extended arm 9 carried by the bearing 10 for engaging the reciprocating member 11. The reciprocating member 11 includes an upstanding vertical rib 12 which terminates in an ear 13 which has integrally formed thereon the ball 14 which receives the bearing 10 which will be hereinafter more specifically described.

The bearing 10 consists of two substantially semi-spherical shaped members 15 and 16 respectively. The semi-spherical members are pivotally connected together at their outer ends by means of a pivot pin 17' and these members are fitted around the ball 14. The semi-spherical member 16 carries the extended arm 9 which receives the outer end of the rod 6. The semi-spherical member 14 carries the relatively short arm 17 which terminates in an enlargement 18. A pin 19 is slidably carried by the arm 9 and has secured thereto the cup shaped member 20. A spring is coiled around the pin and normally holds the same in an extended position. A bale 21 is carried by the cup shaped member 20 and is pivoted to the same at 22 and this bale is adapted to be swung around the relatively short arm 17 and over the enlargement 18 and holds the semispherical members in clamped position around the ball 14.

Extending through the cap 5 is a piston rod 23, on which a piston 24 is secured by means of a nut 25. The piston 24 is provided with the usual packing 26 and is mounted to reciprocate in said cylindrical casing; a coil spring 27 is arranged in the cylindrical casing 2 and surrounds the piston rod 23 and is interposed between the piston 24 and the cap 5 and acts to normally hold the piston 24 yieldably spaced apart from the cap 5.

The opposite end of the piston rod 23 is connected to the crank pin 28 of a pitman wheel 29 by means of the strap or bearing 29'. The strap or bearing member 29' includes two substantially semi-circular members 30 and 31 respectively which are pivotally secured together as at 32 by means of a pivot pin 33. The end of the semi-circular member 30 opposite from the pivot 32 is extended to form the relatively long arm 34 which is enlarged at its outer end as at 35. The large end 35 is provided with the threaded bore 36 which receives the threaded end 37 of the piston rod 23. The semi-circular member 31 has its end opposite the pivot 32 extended to form a relatively short arm 38 which terminates in an enlargement 39 forming a retaining ear. A pin 40 is slidably mounted in an aperture 41 formed in the arm 34 and has rigidly secured at its upper end the cup shaped member 42 which receives the upper end of the expansion coil spring 43 which is coiled around the pin in its extended position. A U-shaped bale 44 is pivoted to the cup shaped member 42 by means of pins 45 and this bale is adapted to be swung over the ear 39, turned on the arm 38 to normally hold the members 30 and 31 together and on the crank pin 29. Suitable brasses 46 are carried by the semi-circular members 30 and 31 for engagement with the wrist pin. The end of the wrist pin is threaded as at 49 and a suitable nut 48 engages the same, which prevents the accidental displacement of the semi-circular members 30 and 31. A coil spring 50 is wound around the piston rod 23 and engages the cap 5 and a washer 51 which is positioned against the enlargement 35, which receives the end of the piston rod and this coil spring counteracts the tension of the coil spring 27 and under normal conditions holds the piston 24 substantially at the point indicated in Fig. 2. This construction of the pitman rod 1 allows the same to yield when the reciprocating cutting member 11 engages an obstruction such as a stone or the like and prevents the cutting member from becoming broken.

From the foregoing description it can be seen that an improved connection is provided for yieldable pitman rods which allows the same to be readily attached or detached to the pitman wheel and the reciprocating cutter blade.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:—

1. In a device of the character described, a yieldable pitman rod, sectional bearings for engaging the reciprocating cutting member and pitman wheel respectively, the sections of said bearings being pivotally secured together, means for attaching the ends of the pitman rod to the bearings, and means for holding the sections of the bearings together.

2. In a device of the character described, a yieldable pitman rod, split bearings for engaging the reciprocating cutting member and pitman wheel respectively of a mowing machine, the sections of the bearings being pivotally secured together, means for detachably securing the ends of the pitman rod to the bearings, and means for yieldably holding the sections of the bearings together.

3. In a device of the class described, a yieldable pitman rod, split bearings for engaging the reciprocating cutting member and pitman wheel of a mowing machine, the sections of said bearings being pivotally secured together, means for detachably securing the ends of the rods to the bearings, and spring means carried by one of the sections of the bearings for engaging the other section of the bearing for normally holding the bearings in locked position.

4. In a device of the class described, a yieldable pitman rod, split bearings for engaging the reciprocating cutting member and pitman wheel of a mowing machine, the sections of said bearings being pivotally secured together, an extended arm carried by one section of each bearing, means detachably securing the ends of the pitman rod to the extended arms of the bearings, a relatively short arm carried by the other section of said bearing, and spring means carried by said relatively longer arm of the split bearing for engagement with the relatively shorter arm of said bearing for normally holding the bearings in position, as for the purpose specified.

In testimony whereof I affix my signature in presence of two witnesses.

JOHN P. GARDNER.

Witnesses:
AXEL LUNDGREN,
ROBERT CRAYTON.